(12) United States Patent
Kim et al.

(10) Patent No.: US 6,282,157 B1
(45) Date of Patent: Aug. 28, 2001

(54) TRACKING AND FOCUSING CONTROL APPARATUS IN AN OPTICAL DISK SYSTEM

(75) Inventors: Je-Kook Kim, Seoul; Young-Wook Jang, Yongin; Suk-Jung Lee, Seongnam; Jeong-Cheol Shin, Suwon, all of (KR)

(73) Assignee: Samsung Electronics Co., LTD (KR)

( * ) Notice: Subject to any disclaimer, the term of this patent is extended or adjusted under 35 U.S.C. 154(b) by 0 days.

(21) Appl. No.: 09/189,192

(22) Filed: Nov. 10, 1998

(30) Foreign Application Priority Data

Nov. 11, 1997 (KR) .................................................. 97-59285

(51) Int. Cl.[7] ...................................................... G11B 7/00
(52) U.S. Cl. .................................... 369/44.35; 369/44.32; 369/53.28; 369/124.15
(58) Field of Search ............................ 369/44.25, 44.27, 369/44.28, 44.29, 44.32, 44.35, 47.14, 47.17, 47.18, 53.12, 53.15, 53.23, 53.28, 53.32, 53.33, 124.15

(56) References Cited

U.S. PATENT DOCUMENTS 4,796,247 * 1/1989 Vogelsang ........................ 369/44.28
5,696,757 * 12/1997 Ozaki et al. ....................... 369/275.4
6,014,354 * 1/2000 Nomura et al. ................... 369/44.28

* cited by examiner

Primary Examiner—Paul W. Huber
(74) Attorney, Agent, or Firm—Mills & Onello LLP

(57) ABSTRACT

A tracking servo control apparatus for muting a tracking error signal when a mirror signal is generated, in an optical disk system, such as a compact disk player or a digital video disk, compensates for tracking gain and phase according to the tracking error signal. The apparatus includes a mirror setting unit for receiving the generated mirror signal and for generating a mirror signal by defining the mirror signal to predetermined minimum and maximum time intervals, a switch for outputting a muted tracking error signal while the defined mirror signal is activated, and otherwise, outputting the tracking error signal, and a tracking gain/phase compensator for receiving the output signal from the switch and compensating for the tracking gain and phase. Thus, the system can be stabilized by muting a tracking servo loop according to a mirror signal whose pulse width is defined to a predetermined window section.

12 Claims, 10 Drawing Sheets

RFO

RFI(G)

PEAK(H)

BOTTOM(I)

COMPARING SIGNAL

MIRR

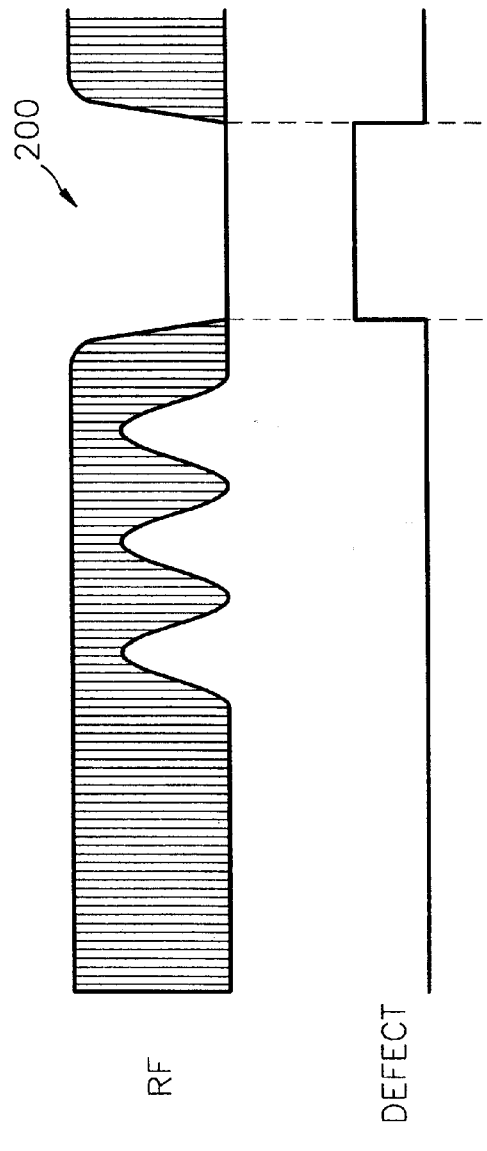
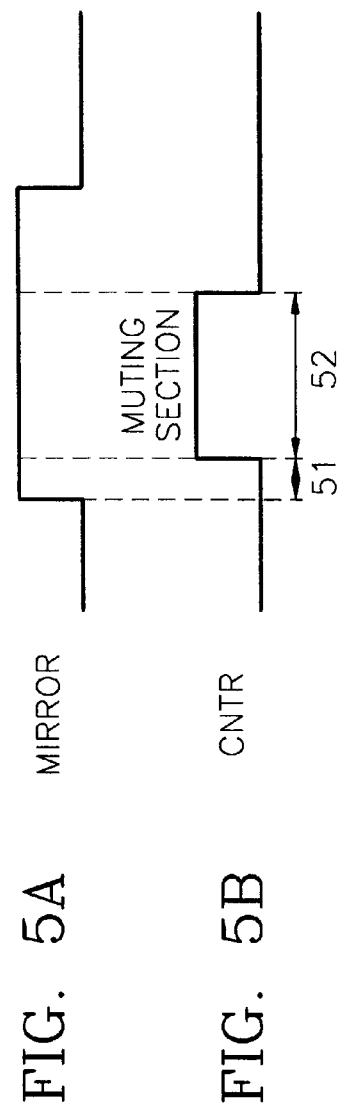
FIG. 4A
FIG. 4B
FIG. 5A
FIG. 5B

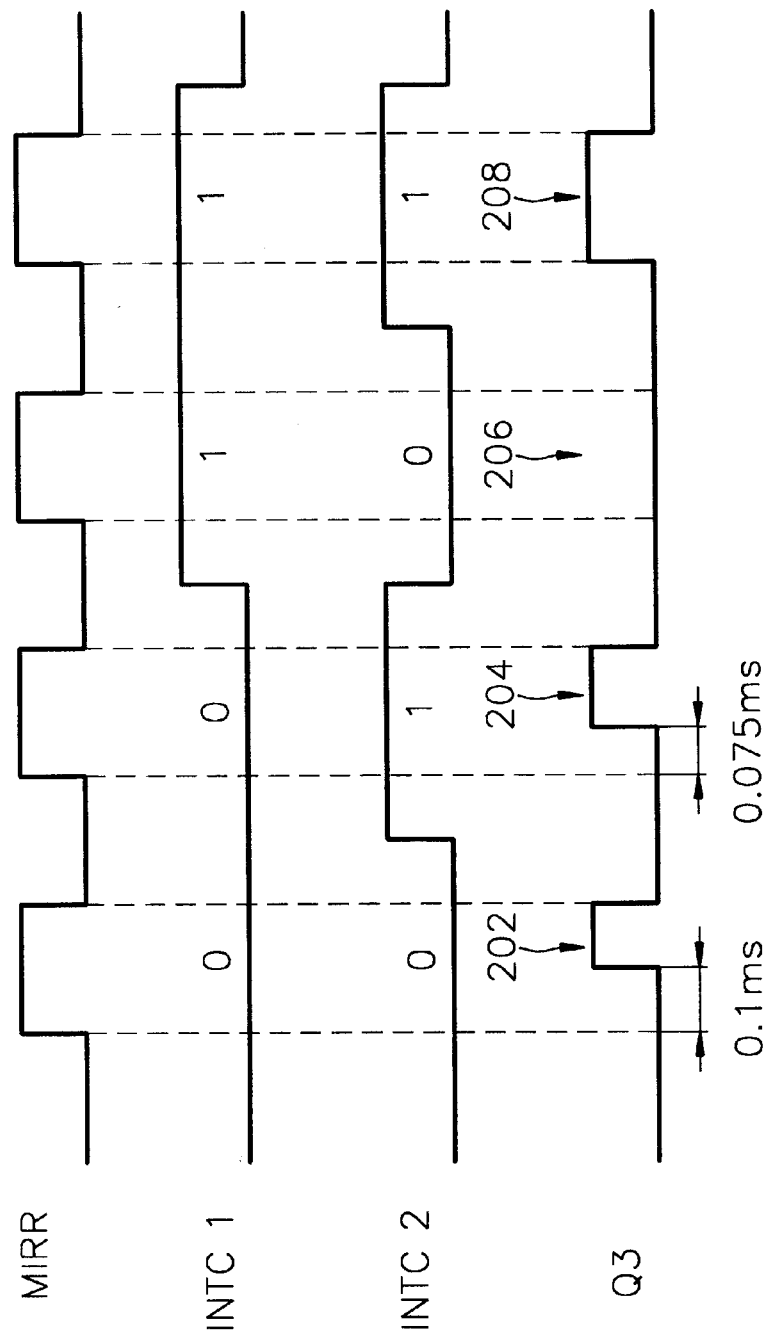

TRACKING AND FOCUSING CONTROL APPARATUS IN AN OPTICAL DISK SYSTEM

BACKGROUND OF THE INVENTION

In a compact disk player (CDP) or a digital video disk player (DVDP), an optical pick-up applies laser energy to a predetermined position on a spiral-shaped disk track, and retrieves the reflected light. A tracking servo directs the light beam to trace the spiral track in all cases, even where the central shaft of the spindle motor driving the disk is eccentric. A focusing servo spaces a pick-up lens from the disk surface at a constant distance, to allow for stability in reading the optical signal.

In a conventional tracking servo, if a mirror warning signal is detected, this is an indication that the disk is out of track. However, when the disk is severely eccentric or deviated, or has many fine scratches, the mirror warning signal is generated too frequently and renders the tracking system unstable, which may cause track jumping.

When a track is selected, for example by a user, a predetermined voltage is applied to a sled motor, which drives a sled, having an optical pickup mounted thereto. The optical pickup is moved to a track position selected by the sled motor, and is focused at the selected track position by the optical pickup lens attached to the sled motor. When a data reproduction command is applied to the sled motor, the lens of the optical pickup may be swayed by a high initial voltage level, or focus drop may occur due to disk defects. Focus loop muting may be applied to prevent the focus drop due to the defect. However, when disk reflectivity is low or if the pickup RF level is reduced, the focus drop cannot be prevented.

SUMMARY OF THE INVENTION

The present invention relates to an optical disk system such as a compact disk player or a digital video disk player, and more particularly, to a tracking and focusing servo control apparatus for muting a tracking servo loop according to a defined mirror signal or for muting a focusing servo loop according to a detected RF level.

To solve the above problem, it is an objective of the present invention to provide an apparatus for controlling a tracking servo, which mutes a tracking servo loop by defining a mirror signal generated when the system is out of track for a predetermined time interval.

It is another objective of the present invention to provide an apparatus for controlling a focusing servo, which prevents focus drop by muting a focusing servo loop according to the level of a detected RF signal.

It is still another objective of the present invention to provide an optical disc drive in an optical disk system for detecting a stable RF signal, including a control apparatus for muting the tracking servo loop and the focusing servo loop.

Accordingly, to achieve the first objective, there is provided a tracking servo control apparatus in an optical disk system for compensating for tracking gain and phase according to a tracking error signal, and for muting the tracking error signal when a mirror signal is generated. The apparatus comprises: a mirror setting unit for receiving the generated mirror signal and generating a modified mirror signal having minimum and maximum time intervals; a selector for outputting a muted tracking error signal while the defined mirror signal is activated, otherwise, outputting the tracking error signal; and a tracking gain/phase compensator for receiving the output signal from the switch and compensating for the tracking gain and phase.

To achieve the second objective, there is provided a focusing servo control apparatus in an optical disk system for compensating for focusing gain and phase according to a focusing error signal. The apparatus comprises: an optical detector for converting an optical signal into an electrical signal; a convertor and amplifier for converting the electrical signal into a voltage signal and amplifying the voltage signal; a radio frequency (RF) level detector for detecting the level difference between the amplified voltage signal and a voltage signal formed by removing an alternating component from the amplified voltage signal; a switch for outputting a signal formed by muting the focusing error signal, when the detected level difference is smaller than a predetermined level or a defect signal is input, otherwise, outputting the focusing error signal; and a focusing gain/phase compensator for receiving the output signal of the switch and compensating for focusing gain and phase.

To achieve the third objective, there is provided an optical disk drive comprising: a pickup for projecting light onto the recording surface of an optical disk, converting a reflected light into a voltage signal, and generating an optical signal; a spindle motor for rotating a turn-table on which the optical disk is loaded; a sled servo unit for moving the pickup in the inner or outer circumference direction of the optical disk; and a servo signal processor for processing an optical signal from the pickup and generating a tracking control signal, a focusing control signal, and an RF signal while generating a sled control signal for controlling the position of the pickup, wherein the servo signal processor comprises: a tracking servo unit for receiving a generated mirror signal, generating a new mirror signal by defining the original mirror signal to predetermined minimum and maximum time intervals, and compensating for tracking gain and phase according to a muted tracking error signal, while the defined mirror signal is turned on or when a defect signal is generated, otherwise, according to the tracking error signal; and a focusing servo unit for detecting the level difference between a voltage signal converted according to a detected optical signal and a new voltage signal obtained by removing an alternating component from the voltage signal, and compensating for focusing gain and phase according to a muted focus error signal when the detected level difference is smaller than a predetermined level or a defect signal is input, otherwise, according to a focus error signal.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 4A–4B illustrate a defect signal which is provided to the minimum mirror setting unit of the tracking servo control apparatus in accordance with the present invention.

FIGS. 5A–5B illustrate a muting control signal CNTR generated by the tracking servo control apparatus in accordance with the present invention.

FIGS. 7A–7C are waveforms for explaining the operation of the minimum mirror setting unit in accordance with the present invention.

DETAILED DESCRIPTION OF PREFERRED EMBODIMENTS

Figure 1:
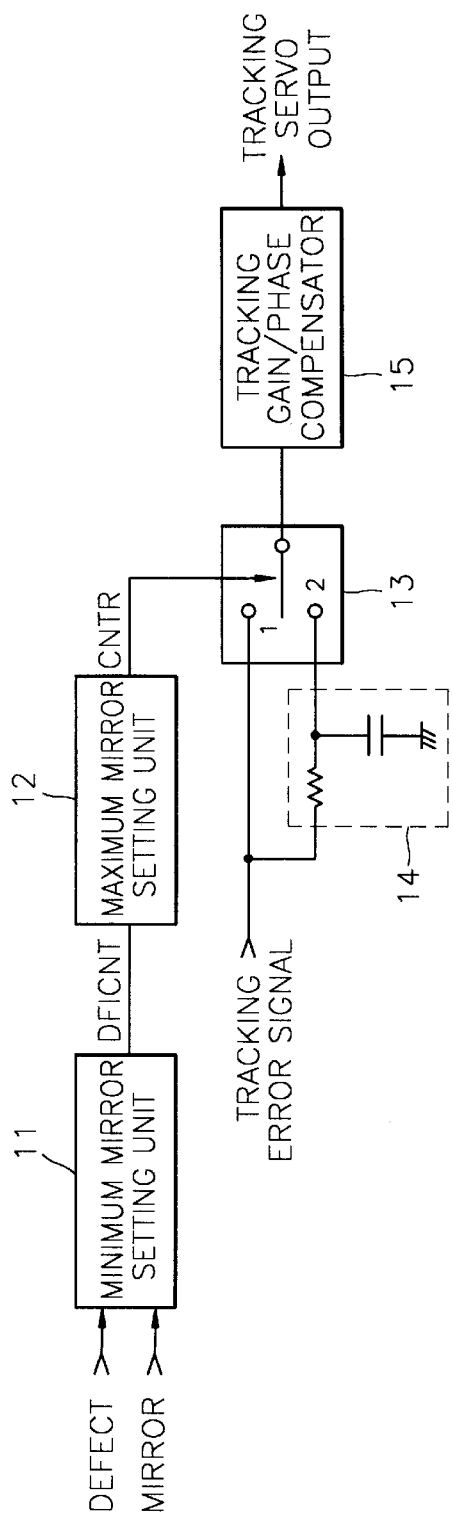
FIG. 1 is a block diagram illustrating an apparatus for controlling a tracking servo, according to the present invention.

In a tracking servo control apparatus as shown in FIG. 1, a defect signal DEFECT and a mirror signal MIRROR are input, and a tracking servo loop is muted by the defect signal or the mirror signal defined by minimum and maximum intervals.

Figure 2:
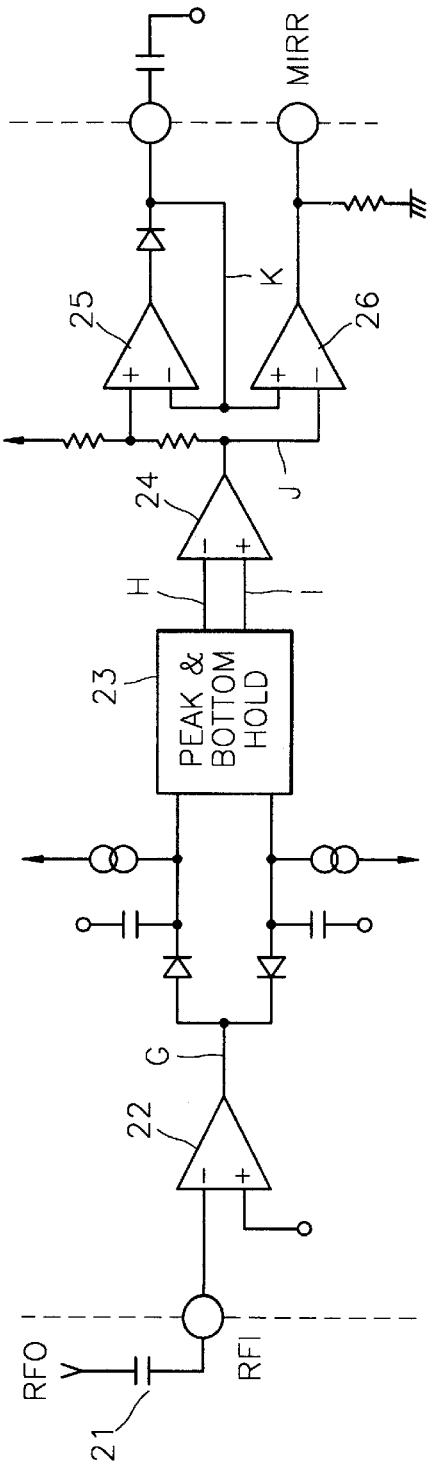
FIG. 2 is a schematic circuit diagram of an apparatus for generating a mirror signal at a minimum setting for the tracking control apparatus in accordance with the present invention.

The defect signal and mirror signal will now be described with reference to FIGS. 2 through 4.

First, a mirror signal generation process will be described with reference to the apparatus shown in FIG. 2 and the waveforms of FIG. 3. In an optical disk system, for example a CD player, an optical pickup applies an optical beam to the disk surface on which signals are recorded, and detects a reflected beam which is modulated according to information stored on the disk. The reflected beam is converted into an electrical signal, referred to as the RF output signal (RFO).

Figure 3A:
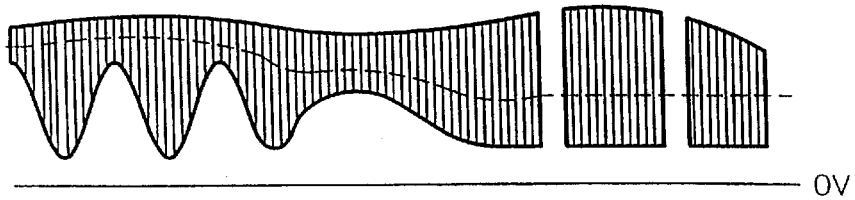
FIGS. 3A–3F are waveforms of signals in the units of the apparatus in accordance with the present invention.
Figure 3B:
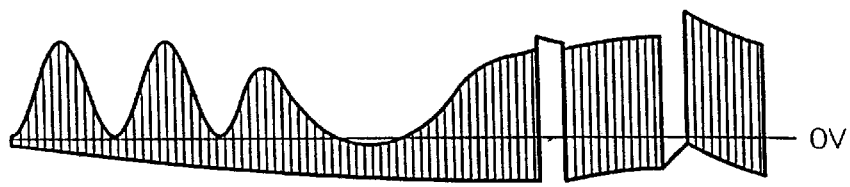
Figure 3C:
Figure 3D:
Figure 3E:
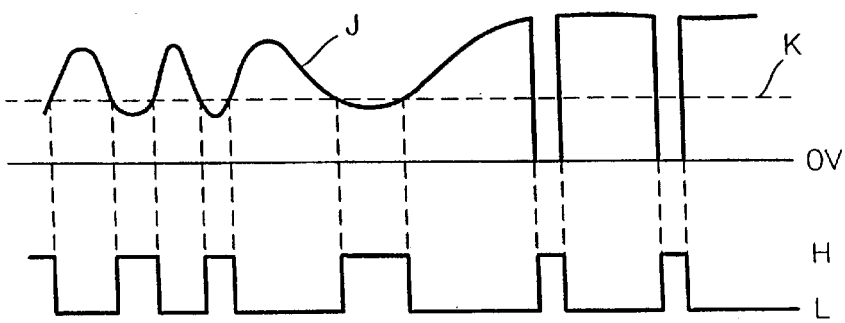
Figure 3F:

FIG. 3A shows a RFO signal, FIG. 3B shows a RFI signal G, FIG. 3C shows a RFI peak signal H, FIG. 3D shows a RFI bottom signal I, FIG. 3E shows signals J and K input to a second comparator 26, and FIG. 3F shows a generated mirror signal. Referring to FIG. 2, a capacitor 21 generates a RFI signal by removing a direct current component from the RFO signal (see FIGS. 3A and 3B). An amplifier 22 amplifies the RFI signal to a predetermined level. A peak and bottom hold circuit 23 detects and outputs the peak signal H and the bottom signal I of the amplified RFI signal G (see FIGS. 3C and 3D). A first comparator 24 generates a signal J according to the difference between the peak signal and the bottom signal. A second comparator 26 receives the output signal J of the first comparator 24 and a predetermined level signal K generated by the amplifier 25 (see FIG. 3E), compares the levels of the received signals to each other, and thus generates the mirror signal of FIG. 3F.

In some situations, an optical pick-up may not detect a signal due to certain defects in the disk, such as a scratch. In such a case, a DEFECT signal is generated, indicating that an RF signal is not detected. The DEFECT signal serves to deactivate the tracking servo. The tracking servo loop controls the light beam to cause it to trace the path of a track, by compensating for deviations in tracking by the optical pick-up.

A MIRROR signal is generated when a light beam from an optical pick-up deviates from a track, and thus is applied to a portion of the disk where no data (or pits) are recorded. A method for generating the MIRROR signal is described with reference to FIGS. 2 and 3.

FIG. 4A shows a radio frequency (RF) signal, and FIG. 4B shows a defect signal DEFECT. The RF signal is an analog signal detected by the optical pickup, and FIG. 4A shows that the RF signal is not detected in region 200 since the optical pickup fails to read a signal, for example due to a damaged disk. The defect signal DEFECT is generated when the RF signal does not exist, and is used to deactivate the tracking servo when it is determined that the disk is defective, for example scratched.

Referring back to FIG. 1, a tracking servo control apparatus according to the present invention will be now be described. The tracking servo control apparatus includes a minimum mirror setting unit 11 for generating an output signal DFICNT comprising a defect signal or a mirror signal defined to a minimum interval, a maximum mirror setting unit 12 for generating a mirror signal to a maximum interval, a switch unit 13 for controlling a contact of a switch according to a control signal CNTR generated by the maximum mirror setting unit 12, a low pass filter 14 for removing a low frequency component from an input signal, and a tracking gain/phase compensation unit 15 for receiving a tracking error signal or a muted signal and for compensating for tracking gain and phase.

The minimum mirror setting unit 11 receives the defect signal DEFECT and the mirror signal MIRROR as described above. When the defect signal DEFECT is logic high or when the mirror signal MIRROR becomes logic high and remains high for a predetermined length of time, the minimum mirror setting unit 11 generates the DFICNT signal at a first boolean logic value, for example logic high. The maximum mirror setting unit 12 receives the DFICNT signal and generates a control signal CNTR by defining a logic high section of the DFICNT signal for a predetermined maximum interval.

FIG. 5A shows an input mirror signal, and FIG. 5B is a control signal CNTR generated by the maximum mirror setting unit 12 in response to the mirror signal. During a minimum interval 51 following input of the mirror signal MIRROR, the control signal CNTR is not generated. During a maximum interval 52 following the minimum interval 51, the control signal CNTR remains active, or high. Following the maximum interval 52, the control signal CNTR becomes low, even through the mirror signal remains high. Accordingly, the tracking servo muting section takes place beginning at the end of the minimum interval 51, to the end of the maximum interval 52. For example, when the minimum interval is set to be 0.1 ms, and the maximum interval is set to be 1.4 ms, the defined mirror signal becomes active between 0.1 ms and 1.4 ms.

When a light beam from an optical pick-up deviates from a track, the MIRROR signal is generated and the tracking loop should therefor be muted. However, when the disk is severely eccentric and deviated, or has many fine scratches, the MIRROR signal is generated too frequently and renders a tracking system unstable, which may cause track jumping. Thus, according to the present invention, the tracking loop is muted when the interval of the MIRROR signal is at least longer than the minimum interval, and shorter than the maximum interval, and is not muted when the muted interval is larger than the maximum interval, to thereby stabilize the tracking servo.

With reference to FIG. 1, the switch unit 13 controls a contact of a switch according to the control signal CNTR generated by the maximum mirror setting unit 12. In the example given, if the control signal CNTR is logic high (see FIG. 5B), the switch contact is connected to port "2", otherwise, the switch contact is connected to port "1". When the switch contact is connected to port "2", a tracking error signal is muted by the low-pass filter 14 and input to the tracking gain/phase compensator 15; otherwise the tracking error signal passes directly. The tracking gain/phase compensator 15 receives either the direct tracking error signal or the muted signal, and compensates for tracking gain and phase.

Thus, even though a mirror signal may be generated too frequently, a mirror signal whose pulse width is defined, for example to between 0.1 ms and 1.4 ms, i.e., having the same period as the defect signal, is generated by setting a predetermined window, which renders the system stable.

A disk of poor quality may have many minute scratches. In such a case, the light beam deviates from the track too frequently due to the defects, and thus mirror signals having short time intervals are generated too frequently. In order to avoid excessive muting of the tracking servo due to such mirror signals, the tracking servo is muted only when the mirror signal is sustained for a predetermined time interval, by defining the pulse width of the mirror signal.

Figure 6:
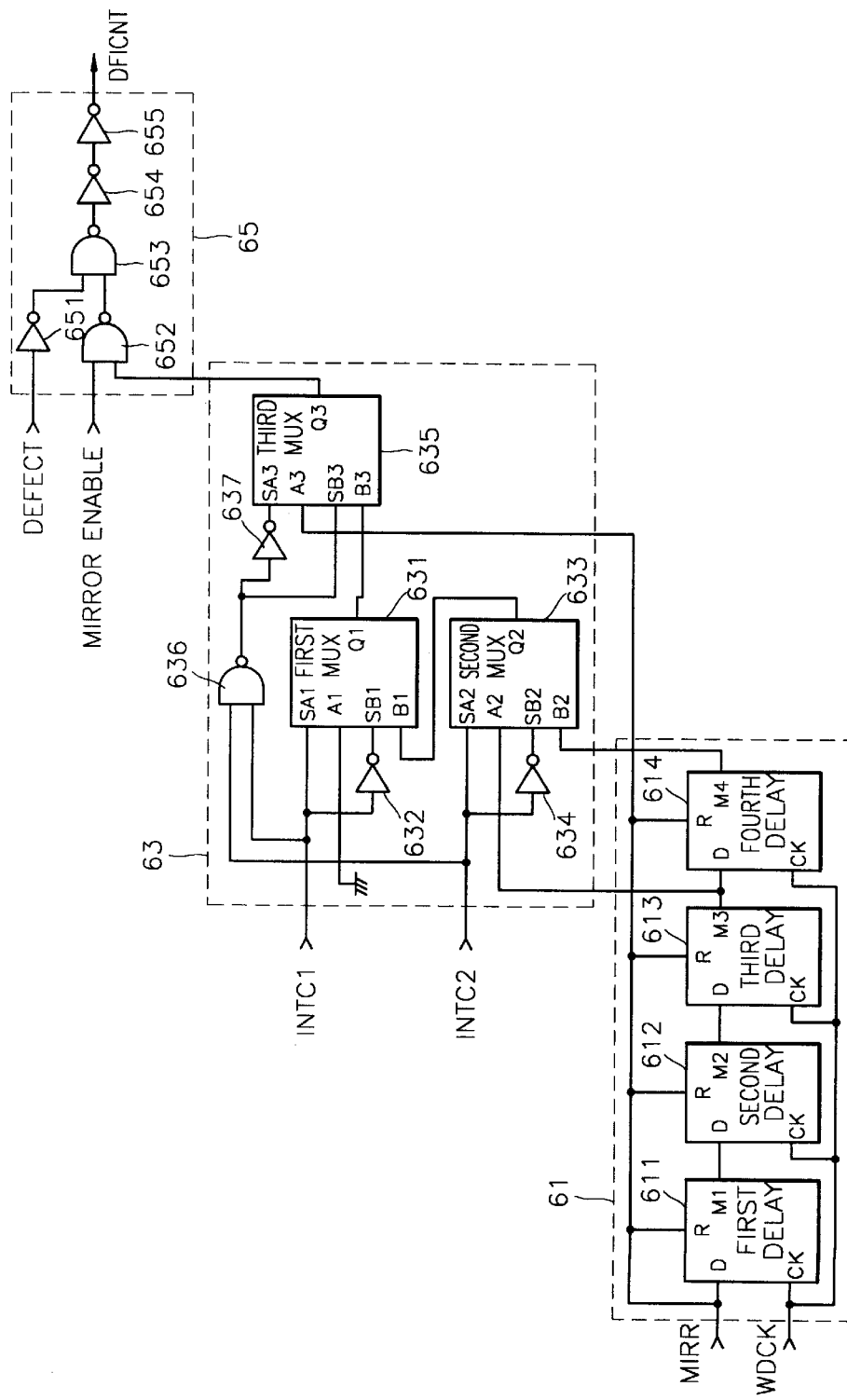
FIG. 6 is a schematic circuit diagram of an embodiment of the minimum mirror setting unit of the tracking servo control apparatus in accordance with the present invention.

FIG. 6 is a schematic circuit diagram of an embodiment of the minimum mirror setting unit 11 of the tracking muting control apparatus shown in FIG. 1. Reference numeral 61 represents a mirror signal delay unit for receiving a mirror signal MIRR and a predetermined clock signal WDCK and for setting a minimum time interval into several steps. Reference numeral 63 represents a mirror signal selection unit for selecting a signal among a mirror off signal, an original mirror signal, and a minimally-defined mirror signal according to first and second control signals INTC1 and INTC2. Reference numeral 65 represents an output unit for outputting the defect signal DEFECT and the mirror signal selected by the mirror signal selection unit 63.

Each delay 611, 612, 613, 614 in the mirror signal delay unit 61 delays an input signal by a predetermined time amount (e.g., 0.025 ms) and outputs the delayed signal. That is, the first delay 611 delays an input mirror signal MIRR by 0.025 ms. The second delay 612 receives the output M1 of the first delay 611 and delays M1 by 0.025 ms a second time, that is, delays the mirror signal MIRR by 0.05 ms. The third delay 613 receives the output M2 of the second delay 612 and delays M2 by 0.025 ms a third time, that is, delays the mirror signal MIRR by 0.075 ms. Similarly, the fourth delay 614 receives the output M3 of the third delay 613 and delays M3 by 0.025 ms a fourth time, that is, delays the mirror signal MIRR by 0.1 ms. Here, the interval of delay time of each delay can be determined as needed, and the number of delays can also be determined as needed, depending on the application.

Accordingly in the example provided, the output M3 of the third delay 613 is a 0.075 ms-delayed mirror signal, and the output M4 of the fourth delay 614 is a 0.1 ms-delayed mirror signal. The signals M3 and M4 delayed by the mirror signal delay unit 61, and the original mirror signal MIRR are input to the mirror signal selection unit 63. In the mirror signal selection unit 63, a first MUX 631 receives a control signal INTC1 via a first selection port SA1 and a signal formed by inverting the control signal INTC1 using an inverter 632 via a second selection port SB1, a ground signal via a first input port A1, and an output signal Q2 of a second MUX 633 via a second input port B1. The second MUX 633 recieves a control signal INTC2 via a first selection port SA2 and a signal formed by inverting the control signal INTC2 using an inverter 634 via a second selection port SB2, an output M3 of the third delay 613 via a first input port A2, and an output M4 of the fourth delay 614 via a second input port B2. In a third MUX 635, a signal formed after the control signal INTC1 is logically NAND-processed by a NAND gate 636 and the NAND-processed signal is inverted by an inverter 637 and input via a first selection port SA3, a signal formed by performing a logic NAND operation on the control signals INTC1 and INTC2 using the NAND gate 636 is input via a second selection port SB3, the original mirror signal MIRR is input via a first input port A3, and the output signal Q1 of the first MUX 631 is input via a second input port B3.

Tables 1 and 2 are truth tables for explaining the operation of the mirror signal selection unit 63 having such a configuration. Table 1 shows the relationship between the output signal Q1 of the first MUX 631 and the output signal Q2 of the second MUX 633 according to the control signals INTC1 and INTC2. Table 2 shows the relationship of the output signal Q3 of the third MUX 635 according to the control signals INTC1 and INTC2.

TABLE 1

| INTC1 | INTC2 | Q2 | Q1 |
|---|---|---|---|
| 0 | 0 | M4 | Q2 (M4) |
| 0 | 1 | M3 | Q2 (M3) |
| 1 | 0 | M4 | GND |
| 1 | 1 | M3 | GND |

TABLE 2

| INTC1 | INTC2 | Q3 | note |
|---|---|---|---|
| 0 | 0 | Q1 (M4) | 0.1 ms-delayed MIRR signal |
| 0 | 1 | Q1 (M3) | 0.075 ms-delayed MIRR signal |
| 1 | 0 | Q1 (GND) | MIRR signal OFF |
| 1 | 1 | Mirr | original MIRR signal |

As shown in Tables 1 and 2, the mirror signal selection unit 63 can output an original mirror signal or a mirror signal delayed by a predetermined time period, according to the control signals, or output a ground signal by deactivating the mirror signal.

The output unit 65 receives a defect signal DEFECT, a mirror enable signal, and the output signal Q3 of the third MUX 633, and outputs a control signal DFICNT.

When the mirror enable signal is logic low, generation of the mirror signal is disabled. That is, when the mirror enable signal is logic low, a first NAND gate 652 generates a logic high signal regardless of the signal level of the output signal Q3 of the third MUX 635, and a second NAND gate 653 outputs a signal according to the level of a defect signal inverted by an inverter 651.

Table 3 is a truth table for showing the operation of the output unit 65.

TABLE 3

| MIRROR ENABLE | Q3 | DEFECT | output of gate (652) | DFICNT |
|---|---|---|---|---|
| 0 | 0 | 0 | 1 | 0 |
| 0 | 0 | 1 | 1 | 1 |

TABLE 3-continued

| MIRROR ENABLE | Q3 | DEFECT | output of gate (652) | DFICNT |
|---|---|---|---|---|
| 0 | 1 | 0 | 1 | 0 |
| 0 | 1 | 1 | 1 | 1 |
| 1 | 0 | 0 | 1 | 0 |
| 1 | 0 | 1 | 1 | 1 |
| 1 | 1 | 0 | 0 | 1 |
| 1 | 1 | 1 | 0 | 1 |

Referring to Table 3, when the mirror enable signal is logic low, the DFICNT signal outputs a DEFECT signal, and when the mirror enable signal is logic high, the signal Q3 and the DEFECT signal are logically OR-processed and the OR-processed signal is output as signal DFICNT.

Figure 7A:
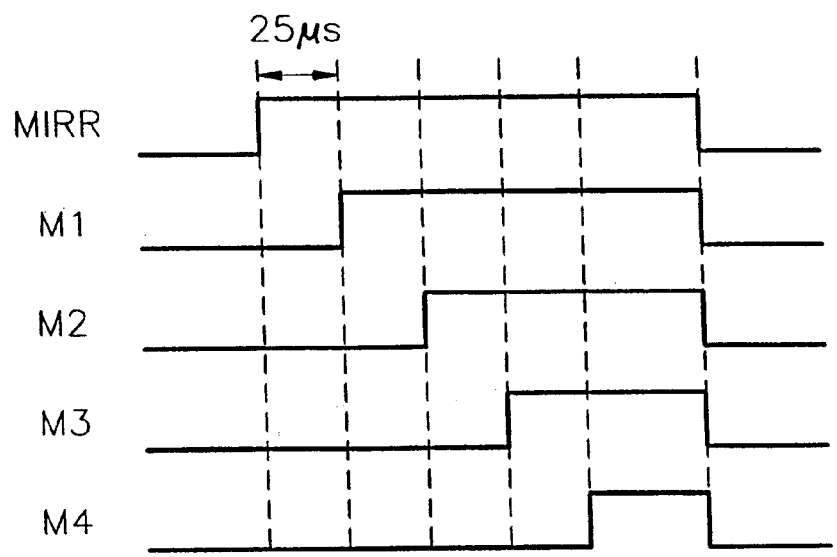
Figure 7B:
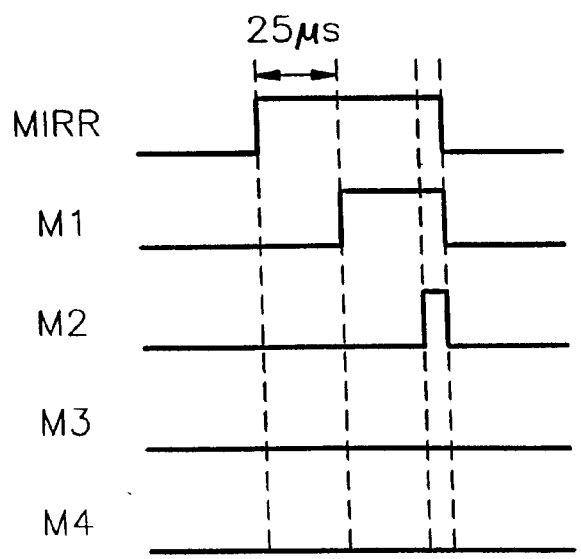

FIGS. 7A through 7C are waveform views for illustrating the operation of the minimum mirror setting unit shown in FIG. 6.

FIGS. 7A and 7B show the relationship between the mirror signal MIRR and each of the output signals M1, M2, M3 and M4 of the delays. Here, the interval of each time tap is 25 $\mu$s. FIG. 7A shows signals M1, M2, M3 and M4 when the mirror signal remains at a high logic level keeps logic high longer than 0.1 ms. Here, the signals M1, M2, M3 and M4 are formed by delaying the mirror signal by 25 $\mu$s, 50 $\mu$s, 75 $\mu$s, and 100 $\mu$s, respectively. FIG. 7B shows M1, M2, M3 and M4 when the mirror signal remains high for 50 $\mu$s to 75 $\mu$s. Here, the signals M1 and M2 comprise, respectively, a 25 $\mu$s-delayed signal and a 50 $\mu$s-delayed signal, while signals M3 and M4 remain at a low logic level. FIG. 7C shows the relationship among the mirror signal MIRR and the control signals INC1, INC2, and Q3. According to the control signals, Q3 outputs a 0.1 ms-delayed mirror signal 202, a 0.075 ms-delayed mirror signal 204, an off mirror signal 206, or an original mirror signal 208.

Figure 8:
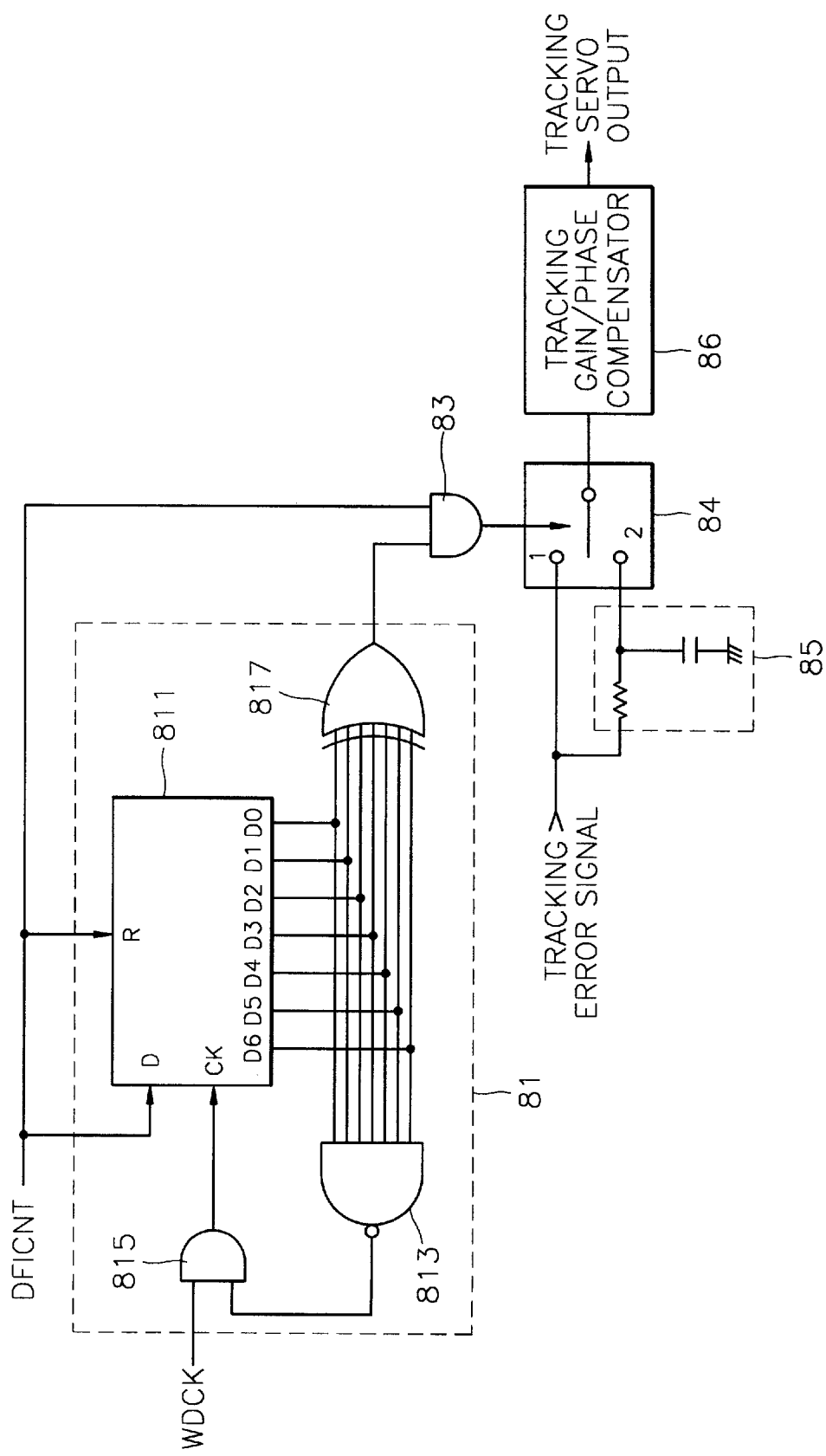
FIG. 8 is a circuit diagram of an embodiment of a maximum mirror setting unit for setting a maximum section of a mirror signal in the tracking servo control apparatus in accordance with the present invention.
Figure 9:
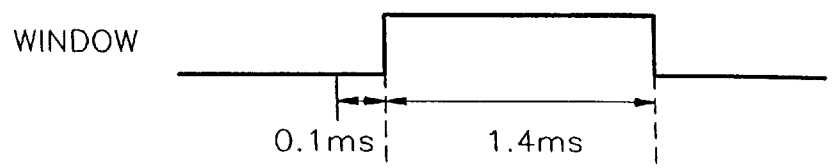
FIGS. 9A–9D are waveforms for explaining the operations of the minimum and maximum mirror setting units in accordance with the present invention.

FIG. 8 is a schematic circuit diagram of an embodiment of the maximum mirror setting unit for setting a mirror signal maximum section in the tracking servo control apparatus of FIG. 1. For purposes of illustration, it is assumed that the DFICNT signal input to the maximum mirror setting unit is the output signal of the minimum mirror setting unit, and that a clock signal WDCK has a frequency of 88.2 KHz(T=11 $\mu$s).

Referring to FIG. 8, reference numeral 81 represents a mirror maximum time defining unit which forces the DFICNT signal to a logic low level, even when the DFICNT signal retains a logic high level longer than a predetermined maximum time, by counting according to the clock signal WDCK. The mirror maximum time defining unit 81 includes, for example, a 7-bit counter 811, a 7-input NAND gate 813, a 7-input NOR gate, and an AND gate 815. The 7-bit counter 811 receives the DFICNT signal via a data port D and a reset port R and the output of the AND gate 815 via a clock port CK, and counts a data signal according to the signal input to the clock port CK. The 7-input NAND gate 813 receives 7-bit output data of the counter 811 and performs a logic NAND operation on the input bits. The 7-input NOR gate receives 7-bit output data of the counter 811 and performs a logic NOR operation on the input bits. The AND gate 815 performs a logic AND operation on the output signal of the NAND gate 813 and the clock signal WDCK, and outputs the result of the AND operation to the clock port CK of the counter 811.

Reference numeral 83 is an AND gate which performs an AND operation on the DFICNT signal and the output of the NOR gate 817 and outputs the result of the AND operation to a switch 84. Reference numeral 84 is the switch for selecting one signal among two signals under the control of the output of the AND gate 83. Reference numeral 85 is a low-pass filter constituted of a resistor (for example 479 k$\Omega$) and a capacitor (for example 0.1 $\mu$F), and reference numeral 86 is a tracking gain/phase compensator for compensating for tracking gain and phase according to the output signal of the switch 84.

The counter 811 counts according to the clock signal WDCK of 88.2 KHz(T=11 $\mu$s) while the DFICNT signal is logic high, and increases the counted value by 1 for each clock signal. When the counted value is 0, the output of the NOR gate 817 is logic low, and the output control signal CNTR of the AND gate 83 is also logic low. When the counted value is between 1 and 126, the output of the NOR gate 817 is logic high, and the output control signal CNTR of the AND gate 83 is also logic high. If the counted value is 127, i.e., if the values of all the output bits of the counter 811 are logic high, the output of the NOR gate 817 is logic low, and the output control signal CNTR of the AND gate 83 is also logic low. Accordingly, even when the DFICNT signal continuously maintains a logic high state, the CNTR signal retains a logic low state.

Thus, the 7-bit counter 811 can define the maximum mirror signal interval to be 11 $\mu$s*127=1.4 $\mu$s by counting up to maximum of 127 according to a WDCK clock of 88.2 KHz. The number of bits of the counter and the frequency of the clock signal can be selected at random according to a set maximum mirror signal interval.

Table 4 describes the operation of the mirror maximum time defining unit 81.

TABLE 4

| counter value | EX-OR output | DFICNT | AND output (CNTR) |
|---|---|---|---|
| 0 | 0 | 1 | 0 |
| 1–126 | 1 | 1 | 1 |
| 127 | 0 | 1 | 0 |

The switch 84 receives a logic high control signal from the AND gate 83 when the DFICNT signal and the output signal of the NOR gate 817 are all logic high, and connects a switch contact to a port "2" when the received control signal is logic high, otherwise, connects the switch contact to a port "1". When the switch contact is connected to the port "2", the tracking error signal is muted by passing through the low-pass filter 85, and the muted tracking error signal is input to the tracking gain/phase compensator 86.

FIGS. 9A through 9D are waveforms for explaining the operations of the minimum mirror setting unit of FIG. 6 and the maximum mirror setting unit of FIG. 8. According to the embodiments of FIGS. 6 and 8, a minimum mirror signal interval is set to be 0.1 $\mu$s, and a maximum mirror signal interval is set to be 1.4 $\mu$s. A window section WINDOW for the mirror signal set, as described above, is shown in FIG. 9.

FIG. 9A shows a mirror signal having an interval smaller than 0.1 $\mu$s, and the response of the control signal CNTR of the switch 84. Here, even when the mirror signal was generated, a logic low control signal CNTR is generated. FIGS. 9B and 9C show a mirror signal having an interval of between 0.1 $\mu$s and 1.5 $\mu$s, and the response of the control signal CNTR of the switch 84. Here, the CNTR signal is driven to a logic high from 0.1 $\mu$s after the mirror signal is generated, and is maintained at that level until the mirror signal is cut off. FIG. 9D shows a mirror signal having an interval of longer duration than 1.5 µs, and the control signal CNTR of the switch 84. Here, the CNTR signal is driven high from 0.1 µs after the mirror signal is generated, and is maintained for only 1.4 µs. Accordingly, even though the mirror signal maintains a logic high state for more than 1.5 µs, a CNTR signal defined to an interval of maximum 1.4 µs is generated.

Figure 10:
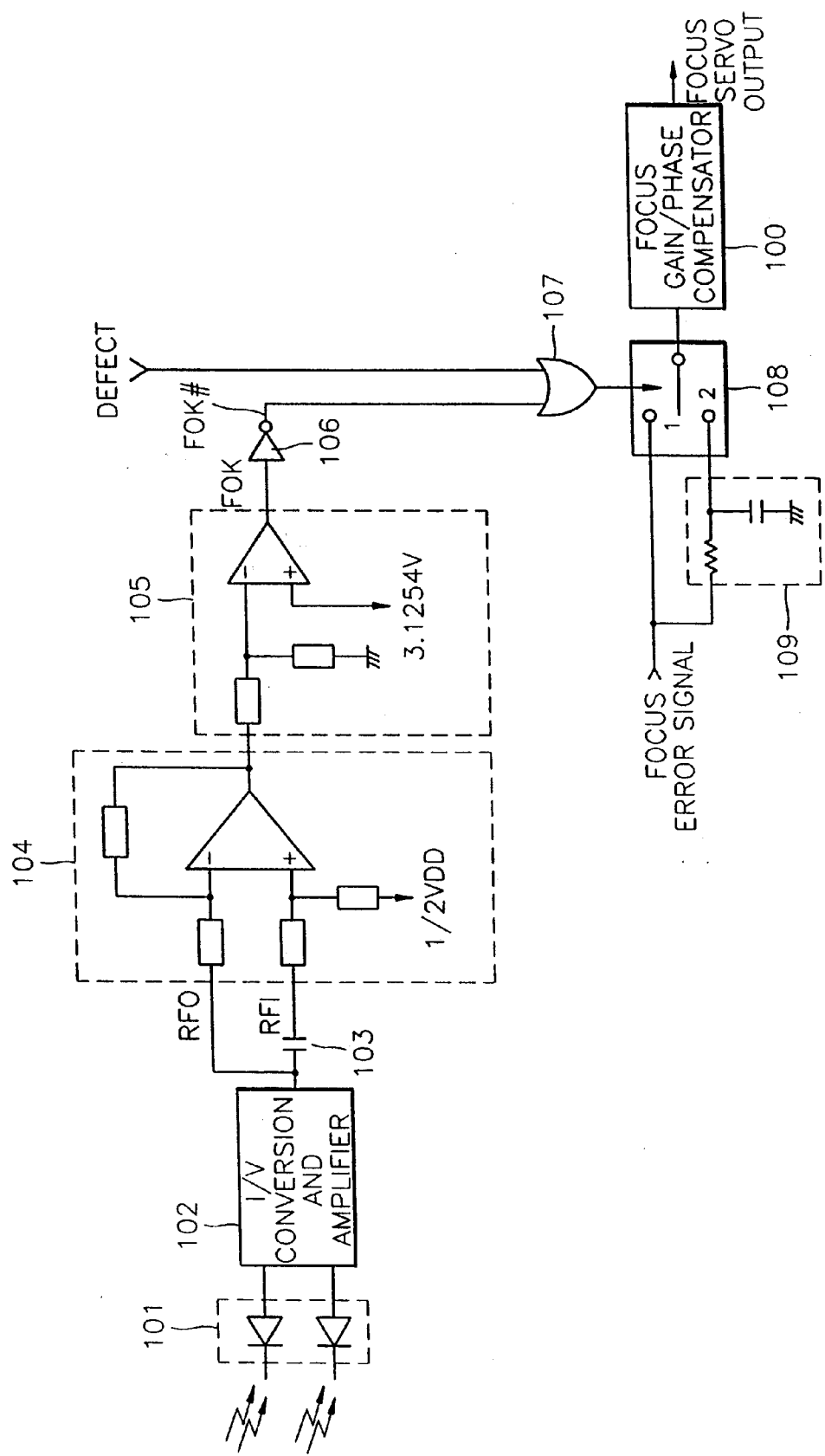
FIG. 10 is a block diagram illustrating the structure of an apparatus for controlling a focusing servo, according to the present invention.

FIG. 10 is a block diagram illustrating an apparatus for controlling a focusing servo, according to the present invention. The focusing servo control apparatus includes an optical detector 101 for converting an optical signal into an electrical signal, a current-to-voltage converter and amplifier 102 for converting a current signal into a voltage signal and amplifying the voltage signal, a capacitor 103 for removing an alternating current component from an input signal, an RF level detection unit 104 comprising a differential amplifier for detecting the level difference between two input signals, a comparison unit 105 for comparing the level of an input signal to a predetermined value, an inverter 106 for inverting an input signal, an OR gate 107, a switch 108 for selecting a signal among two under the control of the output of the OR gate 107, a low-pass filter 109 comprised of a resistor (479 kΩ) and a capacitor (0.1 µF), and a focus gain/phase compensator 100.

The optical detector 10 projects laser energy onto a predetermined position of a disk, and picks up the reflected light. A current signal detected by the optical detector 101 is input to the current-to-voltage conversion and amplifier 102, and is converted into a voltage level and amplified.

An RFO signal output by the current-to-voltage conversion and amplifier 102, and an RFI signal obtained after the RFO signal passes through the capacitor 103, are input to the RF level detection unit 104. Here, the RFO signal contains both alternating and direct components of an RF signal, and the RFI signal contains only the direct component of the RF signal. The RF level detection unit 104 outputs a signal proportional to the level difference between the RFO and RFI signals. The comparison unit 105 compares whether the output signal of the RF level detection unit 104 is larger or smaller than a predetermined level (e.g., 3.1254V). If the output signal of the RF level detection unit 104 is smaller than the predetermined level, the comparison unit 105 outputs a logic low FOK signal. The inverter 106 inverts the logic low FOK signal and outputs a logic high FOK# signal. The OR gate 107 performs an OR operation on the FOK# signal and the DEFECT signal, and outputs the result to the switch 108.

The switch 108 connects a switch contact to a port "2" when either the FOK# signal or DEFECT signal is logic high, otherwise, connects the switch contact to a port "1". When the switch contact is connected to the port "2", the focus error signal is muted by passing through the low-pass filter 109 and then input to the focus gain/phase compensator 100.

Accordingly, a focus loop is muted, not only when the DEFECT signal is logic high, but also when the FOK signal is low, i.e., when the RF level is lowered by poor disk reflectivity by a failure, for example due to a hole or anti-shock. For example, when the RF level is smaller than 0.8Vpp, the FOK signal becomes logic low, and at this time, the focus loop is muted, thus preventing focus drop, a phenomenon that occurs when the distance between the disk surface and the objective lens of an optical pick-up deviates from a specified value due to the swaying of the optical pick-up, or due to defects in the disk, and thus the light beam does not focus accurately the recorded data regions (the pits). When the lens is closer to or further from the disk surface, the detected light beam may be distorted.

Figure 11:
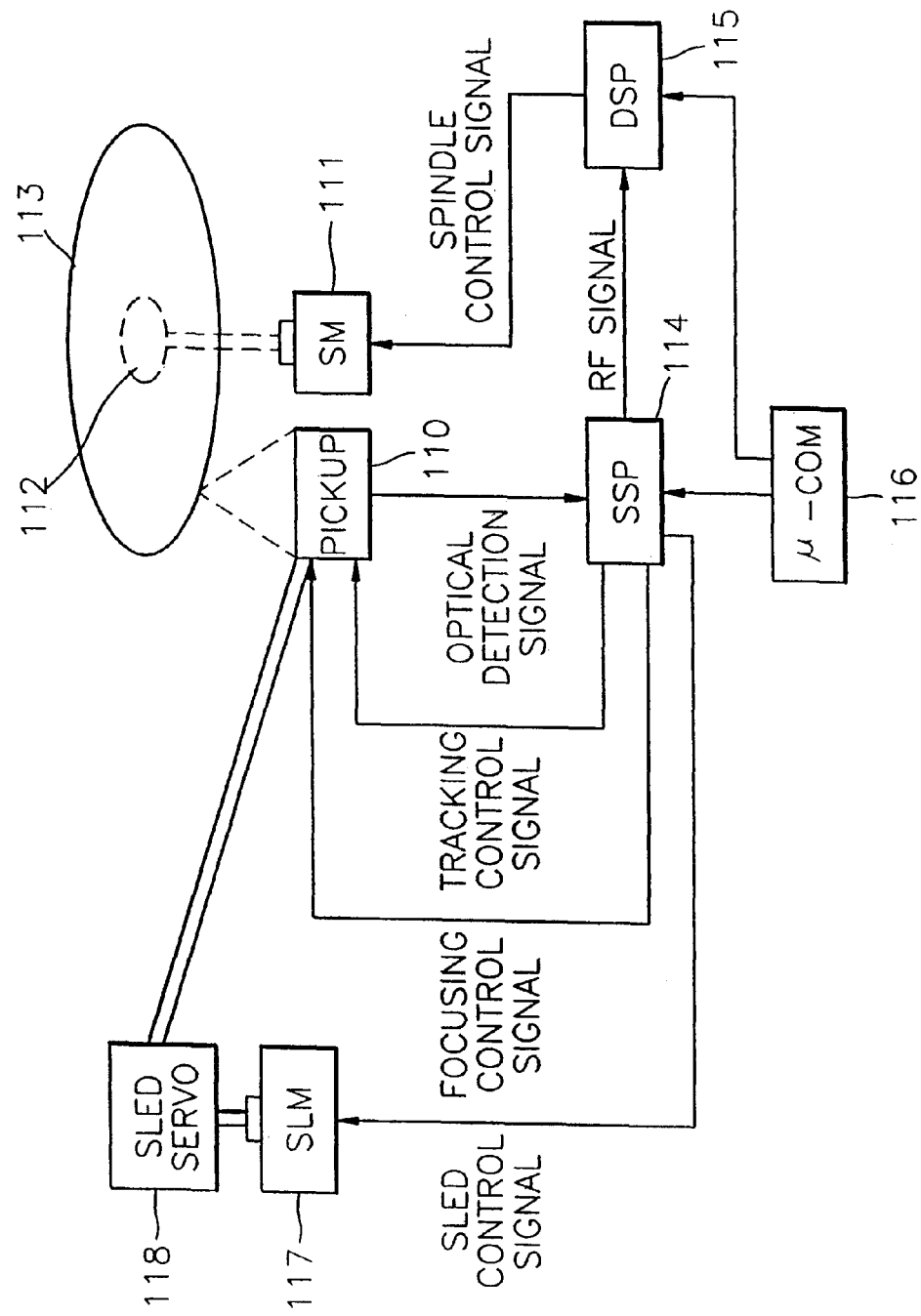
FIG. 11 is a block diagram of units associated with servo control in an optical disk system according to the present invention.

FIG. 11 is a block diagram of units associated with servo control in an optical disk system according to the present invention. The optical disk drive is comprised of a pickup 110, a turn-table 112, a spindle motor 111, a sled motor 117, a sled servo 118, a servo signal processor SSP 114, a digital signal processor DSP 115, and a microcomputer 116.

The pickup 110 projects light onto a recording surface of an optical disk 113, converts reflected light into a voltage signal, and generates an optical signal. The optical disk 113 is loaded onto the turn-table 112. The spindle motor 111 rotates the turn-table 112. The sled motor 117 and the sled servo 118 move the pickup 110 in the radial direction of the optical disk 13. The servo signal processor 114 processes an optical signal from the pickup 110, and generates a tracking control signal, a focusing control signal, and a radio-frequency (RF) signal while generating a sled control signal for controlling the position of the pickup 110. The digital signal processor 115 processes the RF signal and generates a digital audio signal and a spindle control signal. The microcomputer 116 controls the SSP and DSP 114, 115 according to a command signal from a host.

The SSP 114 includes a tracking servo unit and a focusing servo unit. The tracking servo unit receives a generated mirror signal, generates a mirror signal defined to predetermined minimum and maximum time intervals, and compensates for tracking gain and phase. The tracking gain and phase are compensated according to a signal obtained by muting the tracking error signal, when the defined mirror signal is activated or when a defect signal is generated. Otherwise, the tracking gain and phase are compensated according to the tracking error signal. The focusing servo unit detects the level difference between a voltage signal converted according to the detected optical signal and a voltage signal obtained by removing an alternating component from the converted voltage signal, and compensates for focusing gain and phase. Here, when the detected level difference is smaller than a predetermined level, or a defect signal is input, the focusing gain and phase are compensated according to a signal obtained by muting the focus error signal, otherwise, they are compensated according to a focus error signal.

Therefore, even when the mirror signal is generated too frequently, an optical disk system can be stabilized by performing tracking muting according to a mirror signal whose pulse width is defined to a predetermined window. Also, even when the reflection of a disk is deteriorated or the RF level is lowered due to a failure other than a defect, the focus loop is muted, thus preventing the focus drop phenomenon.

According to the tracking and focusing servo control apparatus in an optical disk system as described above, the system can be stabilized by muting a tracking servo loop according to a mirror signal whose pulse width is defined to a predetermined window section. Also, even when the reflectivity of a disk is irregular, and data is retrieved from the disk with many failures (for example holes), instability of the system due to focus drop can be reduced, and the RF level can be stabilized.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. In a tracking servo control apparatus for an optical disk system, a system for muting a tracking error signal when a first mirror signal is generated, the system comprising:
- a mirror setting unit for receiving the generated first mirror signal and generating a modified mirror signal having minimum and maximum time intervals;
- a selector responsive to said modified mirror signal for selecting a muted tracking error signal while the modified mirror signal is active, and for selecting the tracking error signal while the modified mirror signal is inactive; and
- a tracking gain/phase compensator for compensating for tracking gain and phase in said selected signal.

2. The system of claim 1 further comprising means for muting the tracking error signal to generate the muted tracking error signal.

3. The system of claim 2 wherein the means for muting comprises a low pass filter.

4. The system of claim 1 wherein the selector selects a muted tracking error signal when a defect signal is active.

5. The system of claim 1 wherein the mirror setting unit comprises a minimum mirror setting unit for delaying generation of the modified mirror-signal until the first mirror signal is active for a predetermined minimum time interval.

6. The system of claim 5, wherein the minimum mirror setting unit comprises:
- a mirror signal delay for receiving the first mirror signal and a clock signal, and generating a delayed mirror signal by delaying the mirror signal in units of a predetermined time interval corresponding to a multiple of the clock signal;
- a mirror signal selector for selecting one signal among a mirror off signal, the first mirror signal, and the delayed mirror signal according to a control signal; and
- an output unit for outputting the selected one signal as a modified mirror signal.

7. The system of claim 1 wherein the mirror setting unit comprises a maximum mirror setting unit for ceasing generation of the modified mirror signal when the modified mirror signal has been active for a predetermined maximum time interval.

8. The system of claim 7, wherein the maximum mirror setting unit comprises:
- a counter for receiving a second mirror signal and a clock signal, and for counting according to the clock signal while the second mirror signal is active; and
- a circuit for driving the selector based on the count.

9. The system of claim 8, wherein the second mirror signal comprises the first mirror signal.

10. The system of claim 8, wherein the second mirror signal comprises a delayed first mirror signal delayed by the minimum time interval.

11. A focusing servo control apparatus in an optical disk system for compensating for focusing gain and phase according to a focusing error signal, comprising:
- an optical detector for converting an optical signal into an electrical current;
- a convertor and amplifier for converting the electrical current into a voltage signal and amplifying the voltage signal;
- a radio frequency (RF) level detector for detecting the level difference between the amplified voltage signal and a modified voltage signal formed by removing an alternating component from the amplified voltage signal;
- a switch for outputting a signal formed by muting the focusing error signal, when the detected level difference is smaller than a predetermined level or a defect signal is input, otherwise, outputting the focusing error signal; and
- a focusing gain/phase compensator for receiving the output signal of the switch and compensating for focusing gain and phase.

12. An optical disk drive comprising:
- a pickup for projecting light onto the recording surface of an optical disk, converting a reflected light into a voltage signal, and generating an optical signal;
- a spindle motor for rotating a turn-table on which the optical disk is loaded;
- a sled servo unit for moving the pickup in a radial direction of the optical disk; and
- a servo signal processor for processing an optical signal from the pickup and generating a tracking control signal, a focusing control signal, and an RF signal while generating a sled control signal for controlling the position of the pickup, wherein the servo signal processor comprises:
- a tracking servo unit for receiving a generated mirror signal, generating a modified mirror signal having minimum and maximum time intervals, and compensating for tracking gain and phase according to a muted tracking error signal, while the modified mirror signal is active when a defect signal is generated;
- a focusing servo unit for detecting the level difference between a voltage signal converted according to a detected optical signal and a modified voltage signal obtained by removing an alternating component from the voltage signal, and compensating for focusing gain and phase according to a muted focus error signal when the detected level difference is smaller than a predetermined level or a defect signal is input.

* * * * *